United States Patent Office 3,401,160
Patented Sept. 10, 1968

3,401,160
REACTION OF STARCH WITH A SULFUR-TRIOX-
IDE-AMIDE COMPLEX RESULTING IN AN UN-
DEGRADED STARCH SULFATE
Richard G. Schweiger, San Diego, Calif., assignor to Kelco
Company, San Diego, Calif., a corporation of Delaware
No Drawing. Filed May 10, 1966, Ser. No. 548,856
8 Claims. (Cl. 260—233.5)

ABSTRACT OF THE DISCLOSURE

Process for producing sulfate esters of essentially un-degraded polymeric carbohydrate starches, by reacting a gelatinized starch with a sulfur trioxide-amide complex having the formula

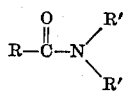

in which R' is a lower alkyl radical and R is selected from the group consisting of the lower alkyl radicals and hydrogen with the reaction being carried out under essentially anhydrous conditions. Sulfate esters of essentially undegraded polymeric carbohydrate starches as prepared by the above process.

---

This invention relates to a method of preparing undegraded sulfate esters of starches. Further, the invention pertains to essentially undegraded sulfate esters of starches and salts thereof as obtained by my method.

Prior art attempts to form sulfate esters of starches have been unsuccessful in that the sulfation reaction produced excessive degradation of the polymeric structure of the starch. This result occurred because of the violence of the esterification reaction which produced degradation of the polymer and also considerable heat.

An object of the present invention is to provide a process for producing sulfate esters of starches in which the carbohydrate structure of the starch remains relatively undegraded.

A further object of this invention is to provide essentially undegraded sulfate esters of starches and salts of such esters.

Additional objects will appear from a reading of the specification and claims which follow.

In accord with my invention, I first activate raw starch so that it can be more readily sulfated. Activation is accomplished by dissolving the starch in water which is preferably heated to a temperature in the range of about 85 to about 90° C. to aid the hydration of the starch. After the starch has been placed in solution, it may be precipitated by the addition of an organic solvent which is miscible with water but which is not a solvent for the starch. Suitable solvents are the lower alcohols such as methanol, or ethanol, simple ketones such as acetone, or glacial acetic acid. A preferred solvent for precipitating the starch from solution is acetone.

Conversely, the starch, after it has been suitably hydrated, may be dried by heating as opposed to precipitation by the addition of an organic solvent. The procedure of hydrating a raw starch and subsequently drying it is well known in the art and is termed "pregelatinization." Many pregelatinized starches are available commercially. In lieu of activating a raw starch for use in my sulfation process, I can employ any of the pregelatinized starches which are already suitably activated.

If the activated starch is precipitiated by the addition of a water-miscible organic solvent, as described above, it is then generally washed with one of the aforementioned water-miscible solvents (preferably acetone) to remove substantially all of the water. Optionally and preferably the starch is then washed with an amide represented by the following formula:

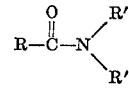

In the above formula R and R' may be a lower alkyl radical such as, for example, a methyl or ethyl radical. In addition, R can be hydrogen. A preferred amide for use in my process is dimethyl formamide. Other suitable amides may be employed, however, such as dimethyl acetamide, diethyl acetamide, and dimethyl propionamide. If desired, the amide may be added directly to the water solution of starch to precipitate the starch from solution. Such a procedure is not generally employed because the quantities of amide required to cause precipitation are relatively large and the procedure is not as effective as that outlined above.

The above procedure is designed to remove essentially all of the water from the precipitated starch and, at the same time, to remove any substantial amounts of solvents, such as a lower alcohol, which would provide undesired side reactions during the subsequent sulfation reaction.

When employing a pregelatinized or activated starch in my process which is in a dried state, the starch is preferably treated with an excess of dialkyl amide, as previously specified, or with dimethyl sulfoxide. In the course of such treatment, the starch swells after which it is in suitable condition for the subsequent sulfation reaction. Although not critical, it is preferable to heat the pregelatinized starch during treatment with the dialkyl amide (preferably dimethyl formamide) or dimethyl sulfoxide since this promotes the rate of swelling of the starch.

The activated starch is then reacted with a complex of sulfur trioxide and an amide of the type specified previously. Preferably, the amide is dimethyl acetamide or dimethyl formamide. The complex is formed by adding sulfur trioxide to the amide with cooling of the reaction mixture to maintain the temperature below about 40° C. Preferably, a slight molar excess of the amide, such as dimethyl formamide, is employed for reaction with the sulfur trioxide. A suitable excess which I have employed requires 2 moles of the amide for each mole of sulfur trioxide. The complex is a crystalline solid which is in a wetted condition due to the excess of amide generally employed in its formation. The wet crystalline solid material can be maintained under refrigeration, for example, at about 4 to 5° C., until ready for use.

The activated starch is preferably reacted with the sulfur trioxide-amide complex in a closed mixer provided with a cooling jacket. The presence of moisture is undesirable since water will react preferentially with the sulfur trioxide-amide complex to form sulfuric acid, which produces degradation of the carbohydrate structure of the starch. It is for this reason that the reaction is preferably carried out in a closed system or in an equivalent manner such as by blanketing the reaction mixture with a dry inert gas.

The sulfation reaction is carried out under agitation to promote an even reaction rate. Since both the sulfur trioxide-amide complex and the activated starch are solids, an excess of amide can be employed if desired to facilitate mixing and heat control during the sulfation reaction. Excess amide can, for example, be admixed with the activated or pregelatinized starch prior to the sulfation step, can be employed in excess in the formation of the sulfur trioxide-amide complex, or can be simply added to the reaction mixture along with the sulfur trioxide complex and the activated starch.

In conducting the sulfation reaction, I have found that a reaction temperature of about 0° C. to about 25° C. is suitable, and that preferably the temperature is below 15° C. The reaction time required for complete esterification is generally from about one to several hours, depending upon the selected temperature and the relative concentrations of the reactants, including diluent and sulfur trioxide-amide complex in the reaction mixture. In general, I use a reaction time of about 2 to about 8 hours and preferably 3 to 4 hours.

The product which is obtained immediately following the esterification may be neutralized by adding a calculated amount of a suitable base to the reaction mixture. Essentially any base can be employed such as an alkali or alkaline earth metal hydroxide, carbonate, or bicarbonate, e.g., sodium carbonate, potassium hydroxide, magnesium hydroxide, calcium hydroxide, and the like. Further, compounds such as ammonium hydroxide, or any of the various ammonium compounds, or the various substituted amines such as methyl amine, ethyl amine, propyl amine, and the like can be employed.

Also, the sulfated product may be neutralized by first diluting the reaction mixture with water and then adding a base, as defined above. If the base employed is water soluble, it can conveniently be added in the form of an aqueous solution. The neutralized product can be precipitated by the addition of a water-miscible solvent in which the sulfated product is insoluble. Suitable water-miscible solvents are those outlined previously and include acetone, and lower alcohols such as methanol and ethanol.

It should be understood that the esters prepared according to my invention are half esters of sulfuric acid. Thus, one of the hydrogen ions originally present in the sulfuric acid is still free to react with a base to form salts. The course of my process may be visualized as having one of the valencies of sulfuric acid esterified with a hydroxyl group of the starch, while the other hydrogen ion is subsequently neutralized by salt formation on the addition of a suitable base. This is merely a way of visualizing the reaction since sulfation is accomplished through the sulfur trioxide-amide complex described previously and not through the use of sulfuric acid itself as a reactant.

To illustrate my invention, there are presented the following examples in which all parts and percentages are by weight unless otherwise indicated.

Example I

A 150 gram portion of a pregelatinized starch (Instant Clearjel) was suspended in 750 cc. of dimethyl formamide (DMF) and heated to 70-80° C. Heating and stirring was continued for 30 minutes. The gelatinized mixture then was cooled to 5° C. in a refrigerator, placed in a laboratory mixer (Day mixer) and, while mixing and cooling, a calculated amount of dimethyl formamide-sulfur trioxide complex was added incrementally over a period of 45-60 minutes. The sulfation complex was prepared in the manner described previously and contained 2 moles of dimethyl formamide for each mole of sulfur trioxide. After a total mixing time of 2 hours, 200 cc. of isopropyl alcohol was added. Subsequently, the reaction mixture was dissolved in ice water and neutralized with sodium hydroxide solution. The sodium salt was precipitated with methanol, hardened and washed with methanol, then dried at 45° C. in the presence of an air stream.

The results of a number of experimental runs conducted in the manner of Example I are set forth in the following table. In the first column is shown the ratio of the number of moles of sulfur trioxide in the sulfation complex to each unit of starch. A starch unit is 162 grams. The crude yield of the sodium salt of starch sulfate is set forth in column two in terms of grams of product per 100 grams of starch reactant. The degree of substitution of the starch sulfate (D.S.) is set forth in columns three and four before and after dialysis of the product. In the last column is shown the viscosity of a 1% aqueous solution of the sodium salt of starch sulfate (without dialysis). The viscosities were taken with a Brookfield Model LVF viscometer at a sample temperature of about 20° C. and a spindle speed of 60 r.p.m.

TABLE I

| Ratio, moles SO$_3$/unit of starch | Yield percent by weight of starch | D.S. before dialysis | D.S. after dialysis | Viscosity (cps.) 1% aqueous solution |
|---|---|---|---|---|
| 0.5 | 100 | 0.28 | 0.08 | 6.4 |
| 1.0 | 66 | 0.82 | 0.47 | 6.4 |
| 1.5 | 161 | 1.23 | 0.56 | 6.5 |
| 2.0 | 183 | 1.65 | 0.83 | 6.6 |
| 2.5 | 253 | 1.81 | 0.99 | 7.2 |
| 3.0 | 237 | 1.91 | 1.44 | 8.2 |
| 3.5 | 303 | 1.93 | 1.58 | 6.2 |

As shown in the above table, my process produces relatively undegraded starch sulfate products having a wide range of degrees of substitution. To produce a product having a higher D.S., the amount of sulfation complex employed is increased with respect to the amount of starch reactant.

The product was subjected to conventional dialysis in order to remove inorganic sulfates which interfere with an accurate determination of the D.S. of the starch product. As shown in column three, the presence of inorganic sulfate salts, prior to dialysis gave a false observed D.S. which was considerably higher than the true D.S. observed after dialysis (column four).

The degree of substitution (D.S.) was determined by adding an aliquot of the sodium salt of the sulfated starch to a 10% aqueous solution of hydrochloric acid. The mixture was heated over-night, e.g., 15-20 hours, at reflux. The free sulfuric acid released was then determined gravimetrically by adding barium chloride to precipitate the sulfate ion as barium sulfate which was collected and weighed. This is a fairly standard analytical procedure.

The maximum degree of substitution of starch obtainable with my process is about 2. Each unit of starch contains 3 hydroxyl groups and thus the maximum degree of substitution theoretically possible is 3. However, the 3 hydroxyl groups do not have the same degree of reactivity. Two of the hydroxyl groups may be readily sulfated using my process while the third hydroxyl group is only sulfated with considerable difficulty.

Example II

A 10 gram portion of pregelatinized starch (Instant Clearjel) was mixed with dimethyl sulfoxide and swelled. The gel obtained was reacted with 50 grams of dimethyl formamide-sulfur trioxide complex by mixing thoroughly in an Erlenmeyer flask and then storing the tightly closed flask and contents in the refrigerator over-night. Twelve grams of the sodium salt of the sulfated starch was isolated in the general manner set forth in Example I. Reprecipitation of the sodium salt by dissolving it in water followed by the addition thereto of acetone gave a product having an observed D.S. (without dialysis) of 0.77.

As shown in Example II, it is not necessary that the solvent employed in the sulfation reaction be the same as the dialkyl amide present with sulfur trioxide in the sulfation complex. This procedure results, however, in a solvent mixture, e.g., dimethyl sulfoxide and dimethyl formamide. A preferable procedure involves the use of a solvent which is the same as the amide present in the sulfur trioxide complex. This procedure does not produce a solvent mixture when the dimethyl formamide is freed from the sulfur trioxide complex during the sulfation reaction.

Example III

Several pregelatinized starches from different sources were sulfated according to my process. The starches were swelled by adding 150 grams of the dry material to 750 milliliters of dimethyl formamide with stirring and heating. Each suspension was held at 80–90° C. for 30 minutes, then chilled for approximately 1 hour by placing it in a freezer. Sulfation was carried out by mixing 425 grams of dimethyl formamide-sulfur trioxide complex with the activated starch for 2 hours in the laboratory Day mixer with cooling. The reaction mixture was dissolved in ice water and neutralized with sodium hydroxide. The product was then precipitated by the addition of methanol. The precipitate was washed with methanol and acetone and then dried at 45° C. in the presence of an air stream. The dimethyl formamide-sulfur trioxide complex contained 2 moles (or 100% excess) of dimethyl formamide for each mole of sulfur trioxide and the complex was employed in an amount to provide 2 moles of sulfur trioxide per anhydro glucose unit in the starch.

To obtain samples for D.S. analysis, part of each product was dialyzed for several days at room temperature followed by concentration in vacuo to dryness.

TABLE II

| Brand | Source | Yield per 100 grams of starch | 1%, 2%, 3% (viscosities in centipoises) | D.S. |
| --- | --- | --- | --- | --- |
| American Maize 721–A. | Waxy Maize. | 235 | 7.7, 19.4, 35.7 | 1.42 |
| Hubinger's OK Pregel. | Corn | 181 | 7.6, 13.2, 21.7 | 1.46 |
| Morningstar-Paisley Redisol 78–D. | Potato | 213 | 6.8, 10.0, 15.6 | 1.31 |
| Morningstar-Paisley Redisol #4. | Tapioca | 236 | 11.2, 24.2, 41.2 | 1.57 |
| American HRW-13 Fine. | Waxy Maize. | 227 | 7.2, 14.7, 27.2 | 1.38 |
| American HR PFP Fine. | Corn | 144 | 4.7, 6.2, 7.6 | 1.50 |
| Morning star-Paisley Redisol-DC. | Tapioca | 236 | 6.5, 9.5, 14.8 | 1.44 |

As shown in Table II, all of the various pregelatinized starches were sulfated according to my process to give essentially undegraded sulfated polymeric starch products. The source of the starch reactant and the brand name for the starch are shown in columns two and one. The crude yield of product in the form of the sodium salt is shown in column three in terms of 100 grams of starch reactant.

The essentially undegraded polymeric structure of the sulfated starch products is indicated by the viscosity data set forth in column three. These data show the viscosities of 1, 2, and 3% by weight aqueous solutions of the sulfated starch in the form of the sodium salt. These viscosities are essentially as high as the viscosities of the starch reactant at the same concentrations. The viscosities were taken with a Brookfield viscometer, Model LVF, at 20° C. using a spindle speed of 60 r.p.m. The degree of substitution (D.S.) of the products was determined in the manner previously described, i.e., precipitating the sulfate ion as barium sulfate which was collected and weighed.

Example IV

A thick paste was formed by mixing 150 grams of a pregelatinized starch (American maize 721–A) with 550 cc. of dimethyl sulfoxide. The paste was cooled in the refrigerator and then sulfated with about 108 grams of dimethyl formamide-sulfur trioxide complex by mixing for 2 hours with cooling. The mixture was then dissolved in ice water, neutralized with sodium hydroxide, and the product was precipitated with methanol. The precipitated product was then dried at 45° C. in the presence of an air stream. The dimethyl formamide-sulfur trioxide complex contained about 2 moles of dimethyl formamide for each mole of sulfur trioxide and the crude yield of the sodium salt of the sulfated starch product was 189 grams. After further purification of the sodium salt by dialysis, its degree of substitution was determined and found to be 0.13. The viscosities of aqueous solutions of the sodium salt of the sulfated starch product were determined with a Brookfield viscometer, Model LVF, at 20° C. with a spindle speed of 60 r.p.m. A 1% solution has a viscosity of 4.7 cps., a 2% solution—6.7 cps., and a 3% solution—10 cps.

Example V

Raw pearl starch was gelatinized by adding 400 grams of starch to 8 liters of hot water and precipitating by adding acetone. The precipitate was hardened in fresh acetone, washed with acetone, and filtered off on a Büchner funnel. The weight of wet starch was 752 grams. One liter of dimethyl formamide was added and the mixture was refrigerated over-night. One-half of the resulting mixture was then reacted with dimethyl formamide-sulfur trioxide complex in an amount providing 1 mole of sulfur trioxide per starch unit. On precipitation of the sulfated starch product in the form of the sodium salt, it was purified by dialysis, analyzed, and found to have a D.S. of about 0.16.

Example VI

Raw pearl starch (200 grams) was gelatinized and precipitated as in Example V. However, the soft precipitate was washed three times with a mixture of acetone-dimethyl formamide in a volume ratio of 1:3, and pressed out on a Büchner funnel. The weight of wet starch (including about 180 grams of dimethyl formamide) was 440 grams. An additional 320 grams of dimethyl formamide was added and the mixture was refrigerated. Sulfation was carried out with 400 grams of dimethyl formamide-sulfur trioxide complex. The sodium salt was obtained in a crude yield of 288 grams. The D.S. after dialysis was 1.11 and the viscosity of a 3% aqueous solution was 26.0 cps.

Example VII 150 grams of a raw potato starch (Aroostocrat) was dissolved in about 3 liters of hot water. After holding at 70° C. for 20–30 minutes, it was cooled to room temperature and precipitated by the addition of 2 volumes of glacial acetic acid for each volume of starch solution. The precipitated starch was then washed three times with glacial acetic acid. The washed starch was then mixed with 500 milliliters of dimethyl formamide in the Day mixer for about 1 hour with cooling. During the course of the mixing, the starch swelled noticeably. Following this, the starch-dimethyl formamide mixture was reacted with cooling with 430 grams of a dimethyl formamide-sulfur trioxide complex containing about 2 moles of dimethyl formamide for each mole of sulfur trioxide. After 3 hours, the contents of the reactor were dissolved in ice water and neutralized by the addition of sodium hydroxide. The mixture containing neutralized sodium salt was passed through a screen to remove any unreacted starch lumps. The sodium salt was precipitated from the filtrate by the addition thereto of methanol and after washing the precipitate with methanol and drying, there was obtained 340.2 grams of the sodium salt of the sulfated starch product. A 1% aqueous solution of the sodium salt was made up and found to have a Brookfield viscosity of 7.5 cps. A portion of the product was subjected to dialysis, then analyzed, and found to have a D.S. of 1.88.

In a further experiment, Example VII was repeated with the exception that the potato starch was precipitated from the hot water by the addition thereto of acetone. After washing the precipitated starch three times with acetone, the material was treated as in Example VII to yield 314.3 grams of the sodium salt of the sulfated starch product. A 1% aqueous solution of this material was found to have a Brookfield viscosity of 7.4 cps. and after further purification through dialysis, the product was found to have a D.S. of 1.79.

Example VIII

A 150 gram portion of amylopectin (Staley, Magnapol S amylopectin Q S–100, commercial grade) was added to hot water at 80° C. and maintained therein for 30 minutes after which it was precipitated by the addition of methanol. After filtering off to leave a hard cake, the precipitate was washed three times with excess acetone. The washed material, still wet with acetone, was then mixed with 500 milliliters of dimethyl formamide at room temperature for 30 minutes and then for an additional 30 minutes more with cooling. During the mixing with dimethyl formamide, the material thickened noticeably. There was then added 430 grams of a dimethyl formamide-sulfur trioxide complex containing about 2 moles of dimethyl formamide for each mole of sulfur trioxide. The sulfation reaction was conducted with cooling and mixing of the reaction ingredients for about 3 hours. The reaction mixture was then added to ice water and neutralized by the addition thereto of sodium hydroxide. The product was precipitated by the addition of methanol after which it was washed with methanol and dried. The yield of the sodium salt of the sulfated amylopectin was 305.1 grams and a 1% aqueous solution of the sodium salt of the sulfated amylopectin was found to have a Brookfield viscosity of 6.4 cps. A portion of the product was subjected to dialysis after which is was analyzed and found to have a D.S. of 1.17.

Example IX 150 grams of amylose (Staley, Nepol, Amylose Q 5–101, commercial grade) was dissolved in hot water at about 80° C. After 30 minutes at about 80° C., it was cooled and precipitated by the addition thereto of excess methanol. The precipitate was then filtered off to leave a hard cake which was washed three times with excess acetone. Following this, the material was dried. It was then lightly milled with a mortar and pestle and mixed with 500 milliliters of dimethyl formamide with cooling. After the material had swelled, it was reacted with cooling with 430 grams of a dimethyl formamide-sulfur trioxide complex containing 2 moles of dimethyl formamide for each mole of sulfur trioxide. Following sulfation, the reaction mixture was dumped into ice water and neutralized by the addition of sodium hydroxide. The sodium salt of the sulfated amylose was precipitated by the addition of methanol after which it was dried. The crude yield of the sodium salt was 382.2 grams and a 1% aqueous solution of the sodium salt was found to have a Brookfield viscosity of 4.5 cps. A portion of the product was further purified by dialysis and on analysis was found to have a D.S. of 1.17.

As shown by the foregoing examples, my invention provides sulfate esters of essentially undegraded starch and the salts thereof. The viscosities of aqueous solutions of the starch sulfate salts prepared according to my invention are essentially as high as the viscosities of aqueous solutions of the starch reactants at the same concentration. Specifically, the viscosities of aqueous solutions of the starch sulfate salts range from about 80% to 100%, or higher, of the viscosities of aqueous solutions of the starch reactants used in their preparation—with both the starch sulfate salts and the starch reactants being at the same concentration. These viscosities clearly show that my materials are colloidal in nature and contain the essentially undegraded carbohydrate structure of starch. In this respect, my products differ markedly from prior sulfated products of starch in which the polymeric carbohydrate structure of the starch itself was degraded so that the resulting product was not colloidal and was not capable of producing viscosities in the order of those produced by my products.

My novel products can be employed in improving the viscosity of glues. To illustrate, I prepared a glue by adding 13.5 grams of dried bone glue (CX bone glue, Armour & Co., Adhesive Division, 1355 W. 31st Street, Chicago, Ill.) and 1.5 grams of the sodium salt of starch sulfate, having a D.S. of 1.8–1.9 and prepared according to my invention, to 105 grams of water. The mixture was heated to 65° C. and then cooled to room temperature. The Brookfield viscosity of the resulting glue was 77 cps. A glue which was prepared in the same manner and contained 15.0 grams of CX bone glue in 105 grams of water had a Brookfield viscosity of only 12 cps.

In the foregoing description, I have referred to various temperatures, times, concentrations and the like. These references to specific conditions have been solely for the purposes of illustration. Thus, I desire that my invention be limited only by the lawful scope of the appended claims.

I claim:
1. A process for producing sulfate esters of essentially undegraded polymeric carbohydrate starches, said process comprising reacting a gelatinized starch with a sulfur trioxide-amide complex wherein said amide has the formula

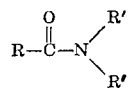

in which R' is a lower alkyl radical and R is selected from the group consisting of lower alkyl radicals and hydrogen, said reaction being carried out under essentially anhydrous conditions.

2. The process of claim 1 wherein said amide is dimethyl formamide.

3. The process of claim 1 wherein said starch is reacted with a sulfur trioxide-amide complex at a reaction temperature of about 0° C. to about 25° C.

4. The process of claim 1 wherein said sulfate ester is neutralized by reaction with a base.

5. The process of claim 3 wherein said sulfur trioxide-amide complex contains a molar excess of said amide.

6. The process of claim 5 wherein said sulfur trioxide-amide complex contains about 2 moles of said amide for each mole of sulfur trioxide.

7. The sulfate esters of essentially undegraded polymeric carbohydrate starches as prepared by the process of claim 1.

8. The sulfate ester salts of essentially undegraded polymeric carbohydrate starches as prepared by the process of claim 4.

References Cited

UNITED STATES PATENTS 3,200,110   9/1965   Gollin et al. _____ 260—210
3,077,373   2/1963   Kerr _____ 260—233.5 XR
2,786,833   3/1957   Wurzburg et al. ____ 260—233.5

DONALD E. CZAJA, *Primary Examiner.*

R. W. MULCAHY, *Assistant Examiner.*